(12) United States Patent
Chang

(10) Patent No.: US 7,543,952 B1
(45) Date of Patent: Jun. 9, 2009

(54) LIGHTING FIXTURE FOR AQUARIUM

(76) Inventor: Ching Feng Chang, 4fl., No. 8, Lane 25, Chun-Lin Rd., Yung-Ho City, Taipei Hsien (TW)

( * ) Notice: Subject to any disclaimer, the term of this patent is extended or adjusted under 35 U.S.C. 154(b) by 0 days.

(21) Appl. No.: 12/010,726

(22) Filed: Jan. 29, 2008

(51) Int. Cl.
*F21V 33/00* (2006.01)

(52) U.S. Cl. .................. 362/101; 362/555; 362/612; 362/228

(58) Field of Classification Search .......... 362/101, 362/555, 612, 228, 229, 351, 359, 361, 235, 362/249, 252
See application file for complete search history.

(56) References Cited

U.S. PATENT DOCUMENTS

| 4,680,678 A | * | 7/1987 | Iwaki ................... 362/545 |
| 7,192,160 B2 | * | 3/2007 | Reiff et al. ............. 362/231 |
| 7,220,018 B2 | * | 5/2007 | Crabb et al. ............ 362/234 |

* cited by examiner

*Primary Examiner*—Thomas M Sember
(74) *Attorney, Agent, or Firm*—Birch, Stewart, Kolasch & Birch, LLP

(57) ABSTRACT

A lighting fixture for use with an aquarium includes a lamp holder holding a lamp tube, a shade made of a light guide material and provided above the lamp tube, the shade having a seat at the rear side. The lighting fixture also includes a circuit board mounted in the seat to hold a set of LEDs and a set of control buttons for controlling operation of the LEDs to work as a night lamp when the lamp tube is off.

11 Claims, 5 Drawing Sheets

LIGHTING FIXTURE FOR AQUARIUM

BACKGROUND OF THE INVENTION

1. Field of the Invention

The present invention relates generally to lighting fixtures and more specifically, to a lighting fixture for use with an aquarium.

2. Description of the Related Art

It is quite common to install an aquarium in the house or office for keeping fish, water animals and water plants. The way of keeping fish, water animals and water plants in an aquarium is a kind of living art. An aquarium can also be a part of indoor decoration. In the art of Feng Shui—'The Law of Heaven and Earth.' The installation of an aquarium in a place is a practice of placement and arrangement of space to achieve harmony with the environment Further, an aquarium will generally be provided with a lighting fixture that can be affixed to the top side of the aquarium directly or by means of a mounting device. FIG. 5 illustrates a conventional lighting fixture for aquarium. As illustrated, the lighting fixture comprises a lamp holder 80, a lamp tube 82 fastened to the lamp holder 80, a shade 81 provided at the top side of the lamp tube 82, a switch 84 at the rear side of the lamp holder 80, and a mounting assembly 83 at the bottom side of the lamp holder 80 for mounting on an aquarium.

The aforesaid lighting fixture is adapted to radiate light rays onto the inside of the aquarium directly. When in use, the lamp tube 82 is constantly kept in "On" status either during the day or the night, wasting much electric energy. When the illumination of the house is off, the light of the aquarium's lighting fixture will be too bright, not suitable for night lamp. Further, the white light of the lighting fixture does not cause a sense of beauty in the deep night.

Therefore, it is desirable to provide a lighting fixture for aquarium that eliminates the aforesaid drawbacks.

SUMMARY OF THE INVENTION

The present invention has been accomplished under the circumstances in view. It is the main object of the present invention to provide a lighting fixture for aquarium that is equipped with a lamp tube for illumination and a set of LEDs for use as a night lamp when the lamp tube is off.

To achieve this and other objects of the present invention, the lighting fixture comprises a lamp holder holding a lamp tube, a shade made out of a light guide material and fastened to the lamp holder around the top side of the lamp tube and having a seat near at the rear side, a circuit board mounted in the seat inside the shade for controlling operation of a plurality of light emitting diodes being carried thereon, a box, which has a top wall affixed to the shade and a plurality of vertical peripheral walls surrounding the circuit board, and a mounting assembly provided at the bottom side of the lamp holder for securing the lamp holder to an aquarium.

DETAILED DESCRIPTION OF THE INVENTION

Figure 1:
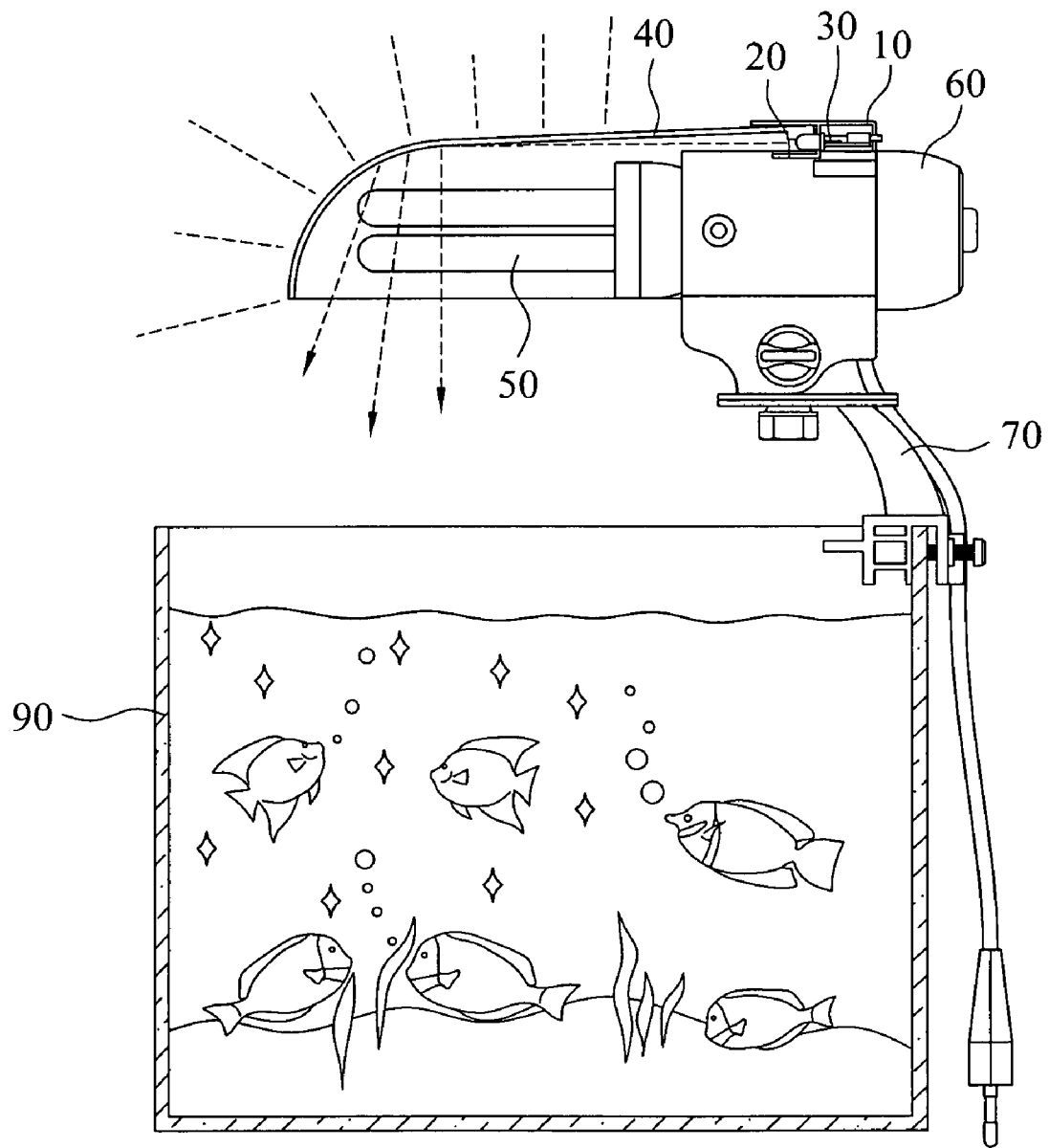
FIG. 1 is a schematic drawing showing a lighting fixture mounted on an aquarium in accordance with the present invention.

Referring to FIGS. 1~4, a lighting fixture for aquarium in accordance with the present invention is shown comprising a lamp holder 60 holding a lamp tube 50, a shade 40, a reflector 40a, a circuit board 30, a locating member 20, a box 10, and a mounting assembly 70.

The shade 40 is provided at the top side of the lamp tube 50. The shade 40 is made out of a light guide material, having a seat 41 at its one end. The seat 41 has a plurality of locating grooves 42.

The reflector 40a is attached to the inside of the shade 40 to reflect the light of the lamp tube 50 toward the bottom side.

The circuit board 30 is mounted in the seat 41 in one end of the shade 40, comprising a plurality of LEDs (light emitting diodes) 31 respectively positioned in the locating grooves 42 of the seat 41 and a plurality of control buttons 32 for controlling the emitting time and color of the LEDs 31.

The locating member 20 is a substantially L-shaped member mounted on the lamp holder 60 to support the circuit board 30, having a horizontal panel 21 and a vertical rack 22. The vertical rack 22 has arched notches 23 for accommodating the LEDs 31.

The box 10 has a horizontal top wall 11 fastened to the top side of one end of the shade 40, a plurality of vertical peripheral walls 12 surrounding the circuit board 30, and a plurality of button holes 13 on one vertical peripheral wall 12 for receiving the control buttons 32 of the circuit board 30.

Figure 2:
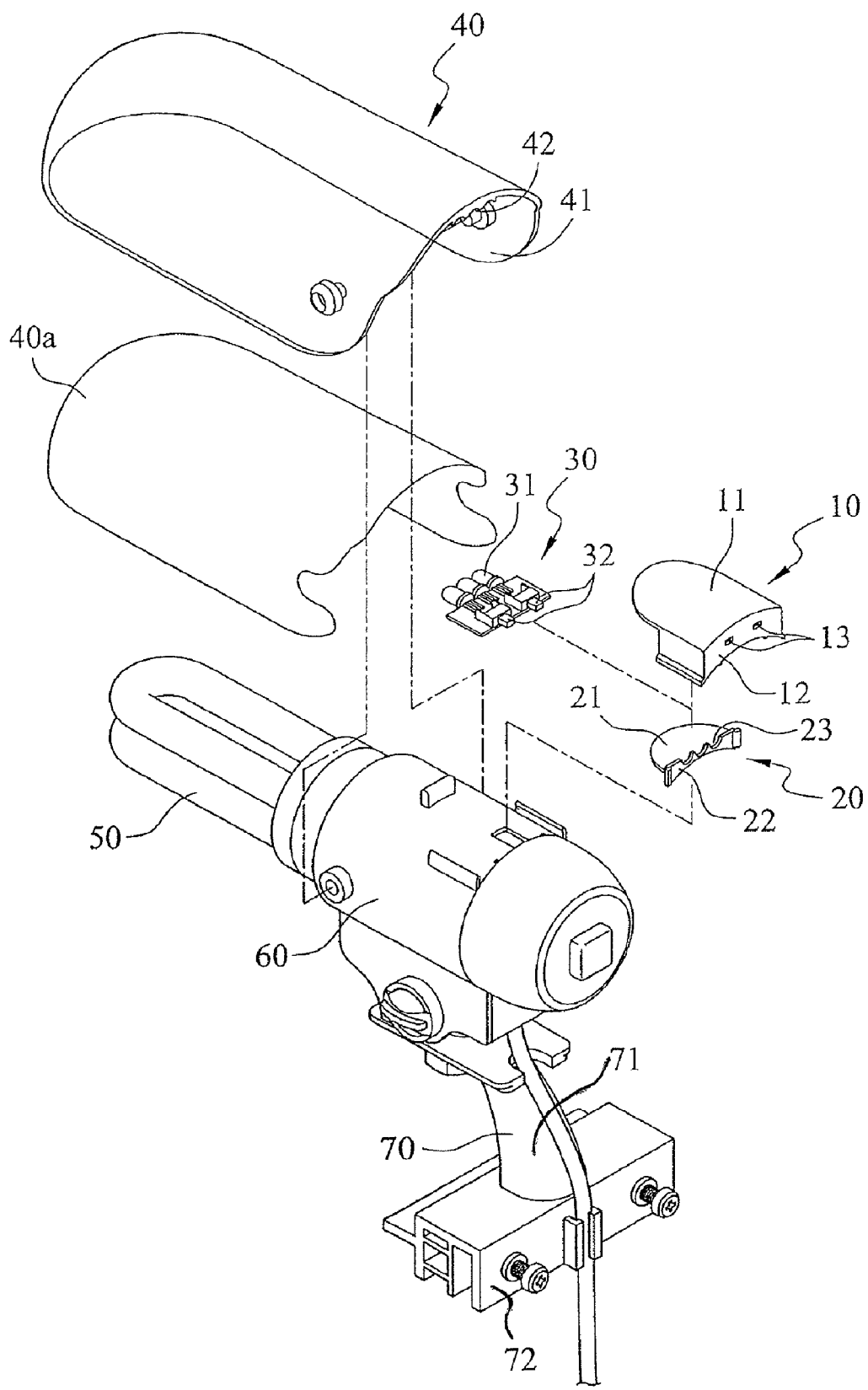
FIG. 2 is an exploded view of the lighting fixture in accordance with the present invention.
Figure 3:
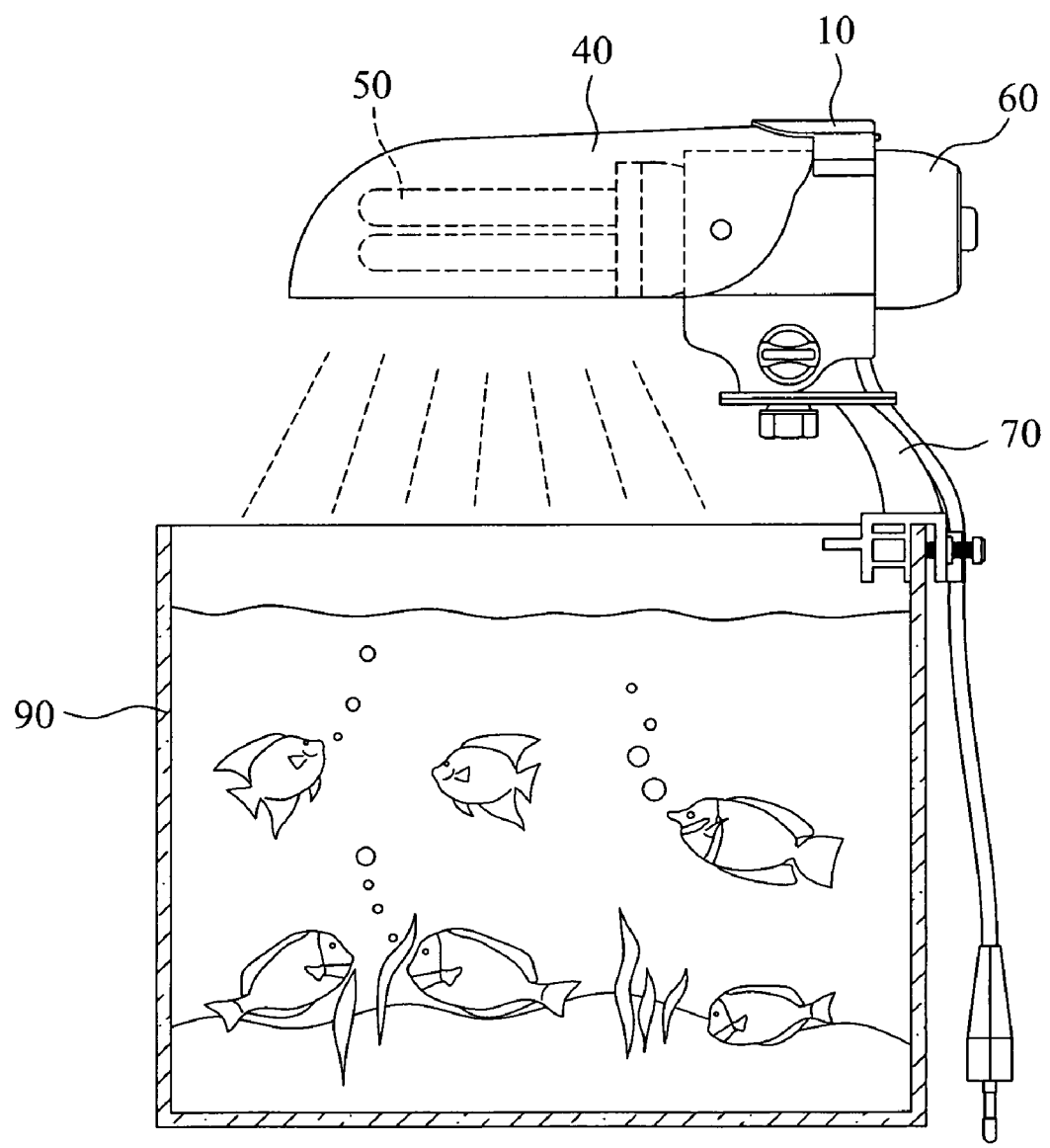
FIG. 3 is a schematic drawing of the present invention, showing the lighting fixture in operation.
Figure 4:
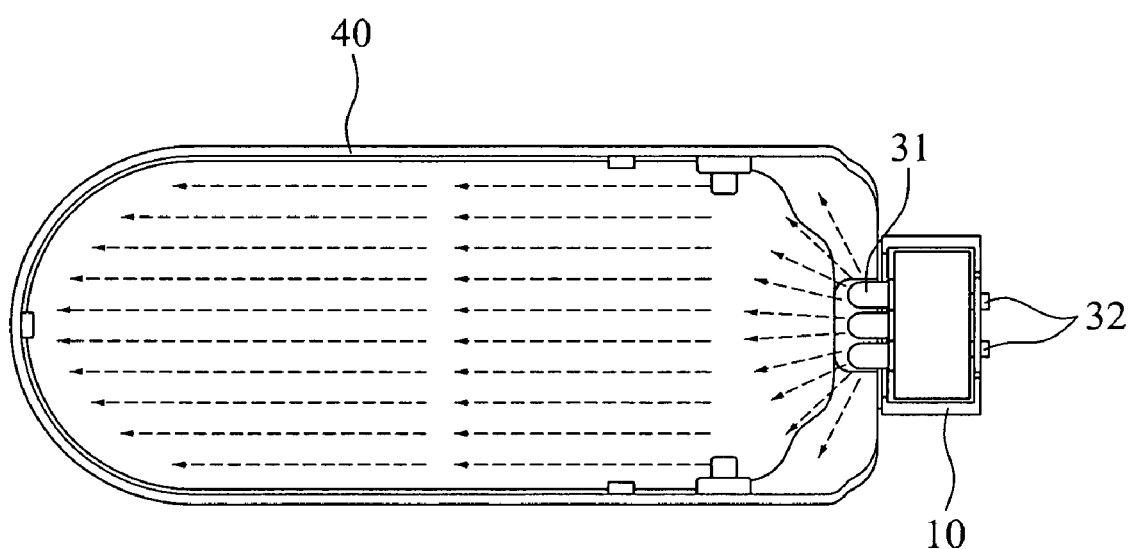
FIG. 4 is a schematic bottom view of the lighting fixture in accordance with the present invention.
Figure 5:
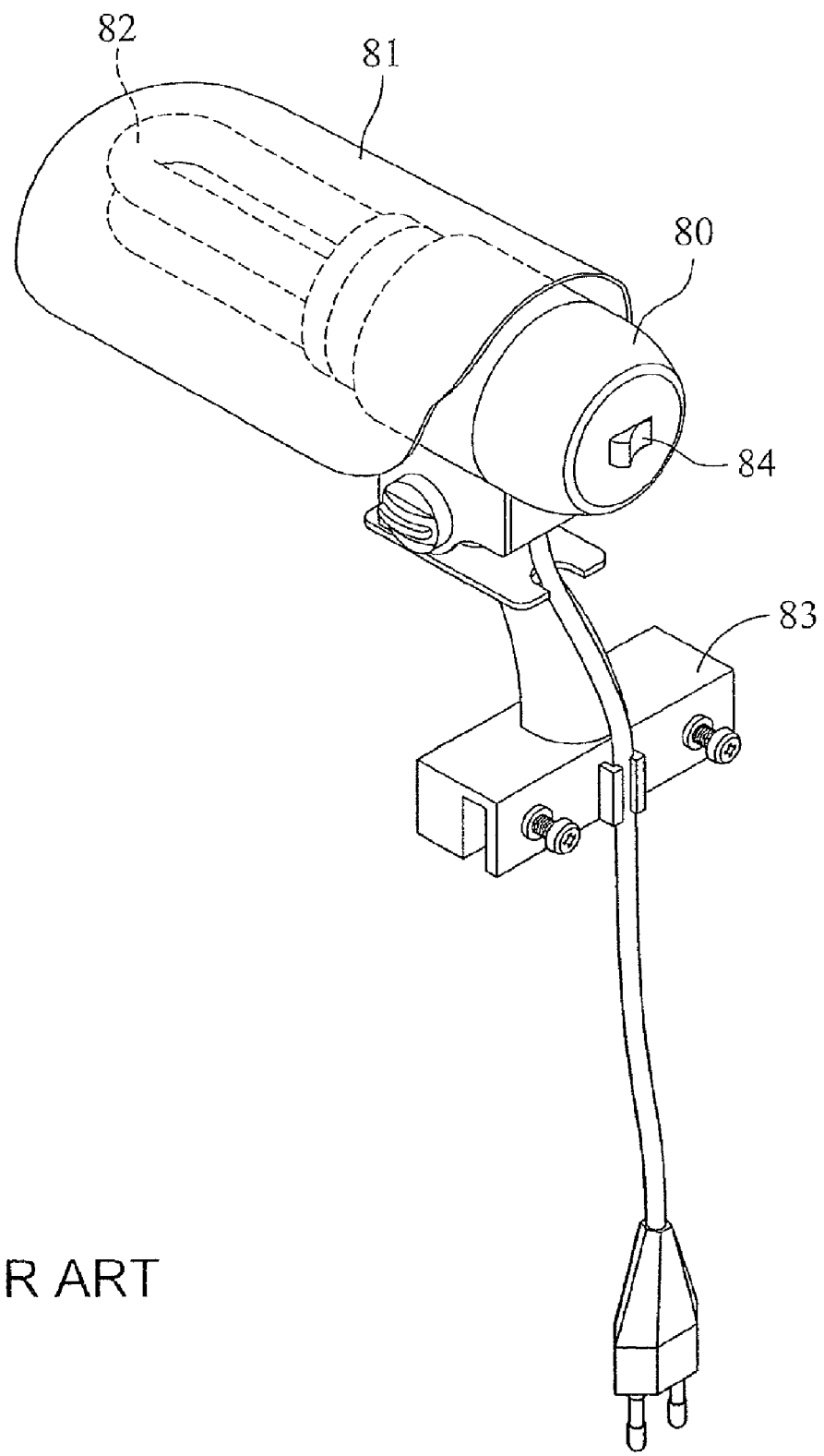
FIG. 5 is a perspective view of a lighting fixture for aquarium according to the prior art.

The mounting assembly 70 is provided at the bottom side of the lamp holder 60 for securing the lighting fixture to an aquarium 90 (see FIG. 3). Alternatively, the mounting assembly 70 can be directly fixedly provided at the aquarium 90 for securing the lamp holder 60. Referring to FIG. 2, the mounting assembly 70 includes a arm member 71 and a clasp member 72. The arm member 71 connects the clasp member 72 to the lamp holder 60. The clasp member 72 is received by a edge of the aquarium 90 for securing the lighting fixture to the aquarium.

Referring to FIG. 3 again, after installation of the lighting fixture in the aquarium 90 by means of the mounting assembly 70, the lamp tube 50 can be turned on to illuminate the aquarium 90. The user can also turn off the lamp tube 50, and then operate the control buttons 32 to drive the LEDs 31 to emit different colors of light and/or to flash, showing a colorful lighting effect.

As stated above, the invention provides a lighting fixture for aquarium, which has a seat provided at one end (the rear side) of the shade to accommodate a LEDs so that the user can turn off the lamp tube of the lighting fixture and turn on the LEDs to work as a night lamp in the deep night, saving electric power consumption.

Although a particular embodiment of the invention has been described in detail for purposes of illustration, various modifications and enhancements may be made without departing from the spirit and scope of the invention. For example, oscillator means may be used to atomize water into a fine spray. Accordingly, the invention is not to be limited except as by the appended claims.

What is claimed is:

1. A lighting fixture for use with an aquarium, comprising a lamp holder holding a lamp tube, and a shade fastened to said lamp holder and surrounding a top side of said lamp tube, wherein:
   said shade is made out of a light guide material, having a seat near the border thereof;
   a circuit board is mounted in said seat inside said shade for controlling operation of a plurality of light emitting diodes being carried on said circuit board;
   a box, said box having a top wall affixed to said shade and a plurality of vertical peripheral walls surrounding said circuit board;
   a mounting assembly is provided at a bottom side of said lamp holder for securing said lamp holder to an aquarium.

2. The lighting fixture as claimed in claim 1, wherein said seat of said shade has a plurality of locating grooves that accommodate said light emitting diodes.

3. The lighting fixture as claimed in claim 2, wherein said circuit board comprises a plurality of control buttons respectively extending out of said box for operation by a person to control the operation of said light emitting diodes.

4. The lighting fixture as claimed in claim 1, wherein a locating plate is affixed to said lamp holder to support said circuit board.

5. The lighting fixture as claimed in claim 4, wherein said locating plate is a substantially L-shaped member, having a horizontal panel and an upright rack at one side of said horizontal panel.

6. The lighting fixture as claimed in claim 4, wherein said vertical rack of said locating plate has a plurality of smoothly arched notches for accommodating said light emitting diodes.

7. The lighting fixture y as claimed in claim 1, wherein said shade has a reflector mounted on an inner side thereof for reflecting light from said lamp tube.

8. The lighting fixture as claimed in claim 1, wherein said control buttons control emitting time and color of said light emitting diodes.

9. A lighting fixture for use with an aquarium, comprising a lamp holder holding a lamp tube, and a shade fastened to a top side of said lamp holder and surrounding a top side of said lamp tube, wherein:
   said shade is made out of a light guide material, having a seat near a border thereof and a circuit board mounted in said seat for controlling operation of a plurality of light emitting diodes being carried on said circuit board;
   a mounting assembly is provided at a bottom side of said lamp holder for securing said lamp holder to an aquarium.

10. The lighting fixture as claimed in claim 9, wherein the seat includes a plurality of locating grooves and the plurality of light emitting diodes are respectively positioned in the locating grooves of the seat.

11. The lighting fixture as claimed in claim 9, wherein the mounting assembly includes a arm member and a clasp member, the arm member connecting the clasp member to the lamp holder.

* * * * *